United States Patent
Ito et al.

[11] Patent Number: 5,867,618
[45] Date of Patent: Feb. 2, 1999

[54] OPTICAL FIBER GRATING AND METHOD OF MANUFACTURING THE SAME

[75] Inventors: Masumi Ito; Maki Ikeji; Tadashi Enomoto, all of Yokohama, Japan

[73] Assignee: Sumitomo Electric Industries, Ltd., Osaka, Japan

[21] Appl. No.: 872,229

[22] Filed: Jun. 10, 1997

[30] Foreign Application Priority Data

Jun. 10, 1996 [JP] Japan ................................. 8-147598

[51] Int. Cl.⁶ .................................................. G02B 6/34
[52] U.S. Cl. ........................... 385/37; 385/123; 385/128
[58] Field of Search .............................. 385/10, 37, 123, 385/124, 128; 359/566, 569, 573; 430/290; 65/390, 392, 394, 425

[56] References Cited

U.S. PATENT DOCUMENTS

| | | | |
|---|---|---|---|
| 5,351,321 | 9/1994 | Snitzer et al. | 385/37 |
| 5,633,966 | 5/1997 | Nakaishi | 385/37 |
| 5,745,615 | 4/1998 | Atkins et al. | 385/37 |

Primary Examiner—Hemang Sanghavi

Attorney, Agent, or Firm—Intellectual Property Group of Pillsbury Madison & Sutro LLP

[57] ABSTRACT

This invention relates to an optical fiber grating and a method of manufacturing the same. According to the method, a hydrogen doping process is performed before ultraviolet irradiation in order to obtain a sufficient photo-induced refractive index change. In particular, a target for the hydrogen doping process of the method is characterized by a coated fiber obtained by covering the outer surface of the bared fiber having a core region and a cladding region with the resin. After the coated fiber is exposed in a hydrogen atmosphere in a predetermined pressurized state for a predetermined period of time, the resin is partially removed. An ultraviolet ray is irradiated on the predetermined area of the bared fiber from which the resin is removed, thereby forming a reflection grating in the core region. The method is also characterized in that the pressure of the hydrogen atmosphere is reduced from the pressurized state while adjusting the pressure reducing rate. Degradation of the bared fiber surface can be prevented, and generation of bubbles or the like between the bared fiber and the resin coating can also be prevented, thereby obtaining an optical fiber grating with high reliability.

8 Claims, 6 Drawing Sheets

OPTICAL FIBER GRATING AND METHOD OF MANUFACTURING THE SAME

BACKGROUND OF THE INVENTION

1. Field of the Invention

The present invention relates to an optical fiber grating (optical component) having an optical fiber and a Bragg grating provided in the core region of the optical fiber along its longitudinal direction and a method of manufacturing the same.

2. Related Background Art

In recent years, optical communication system configurations have advanced along with the recent developments of optical fiber communication techniques to realize sophisticated networks and achieve signal wavelength multiplexing. In these optical communication systems, the importance of optical circuit elements (optical components) is increasing.

A fiber type element as a general example of the optical circuit elements has advantages in that it is compact and has a small insertion loss and it can be easily connected to an optical fiber serving as a transmission line. An example of such a fiber type optical component is a fiber type filter. As is known well, when an ultraviolet ray is irradiated on glass doped with germanium oxide ($GeO_2$), the refractive index changes in the irradiated portion.

In recent years, research and development of an optical fiber grating having a Bragg grating formed in the core region of an optical fiber have been made as an example of a fiber type filter using a photoinduced refractive index change. In this specification, an optical fiber grating is defined as an optical component having at least an optical fiber comprising a core region having a predetermined refractive index and doped with $GeO_2$ and a cladding region provided around the core region and having a lower refractive index than the core region, and a Bragg grating formed in the core region of the optical fiber along its longitudinal direction. The grating is defined as a region in which the refractive index of the core region periodically changes along the longitudinal direction of the core region irradiated with an ultraviolet ray, or the like.

More specifically, the optical fiber grating has a function of reflecting a light component having a specific wavelength (to be referred to as a reflection wavelength of grating hereinafter) of light propagating along the optical fiber and transmitting the remaining light component (i.e., a light component having a wavelength shifted from the reflection wavelength of grating). The reflection wavelength of grating is determined by the pitch of a refractive index change induced in the core region. A method of forming a photoinduced grating in an optical fiber upon irradiation of an ultraviolet ray has an advantage of high productivity.

In such an optical fiber grating, its reflectance R serves as an important characteristic factor. The reflectance R depends on the length of the grating (i.e., the length of a region in which the refractive index of the core region periodically changes along the longitudinal direction of the core region) and the amount of the photoinduced refractive index change. This relation is expressed as:

$$R = \tanh^2(L\pi\Delta n/\lambda_R)$$

where
R: reflectance
L: length of grating
$\Delta n$: amount of photoinduced refractive index change
$\lambda_R$: Bragg wavelength.

SUMMARY OF THE INVENTION

As is generally known, a refractive index change induced by ultraviolet irradiation generates on the basis of glass defects associated with germanium contained in glass corresponding to the core region. According to the findings of the present inventors, however, since the number of glass defects is small in a conventional optical fiber (glass fiber) having a core region doped with germanium oxide, the amount $\Delta n$ of the photoinduced refractive index change is small even with ultraviolet irradiation. As can be apparent from the above equation, the reflectance R is also low. More specifically, the refractive index change in the core region induced by ultraviolet irradiation is about $10^{-5}$, while the reflectance is as low as several %.

The length L of the grating may be increased in order to increase the reflectance R of the grating, as indicated by the above equation. In this case, however, excellent uniformity is required for an ultraviolet laser beam in irradiating it. For this reason, an optical system for irradiating an ultraviolet ray is undesirably complicated. In addition, as the number of glass defects is small, this reduces the rate of photoinduced refractive index change. Increasing the reflectance R under this circumstance requires a long irradiation time, resulting in a low productivity.

As a method of increasing the reflectance R of the grating, Japanese Patent Laid-Open No. 7-244210 discloses a technique for doping hydrogen in the core region of an optical fiber in order to increase the amount of photoinduced refractive index change with respect to the irradiation power of the ultraviolet ray. According to this method, hydrogen is added to the optical fiber using a high-pressure hydrogen pressurizing process. To increase a photoinduced refractive index change, hydrogen is desirably doped in a high concentration. For this purpose, to obtain an optical fiber doped with high-concentration hydrogen, the optical fiber is exposed for a predetermined period of time in an atmosphere containing hydrogen (to be referred to be a hydrogen atmosphere hereinafter) in which hydrogen is pressurized to a high pressure.

The present inventors have examined the above hydrogen doping technique and found the following problem. More specifically, when hydrogen is doped in a silica glass fiber by the conventional hydrogen doping technique, the tensile strength of glass abruptly decreases due to degradation of the glass surface. When a Bragg grating is formed in a surface-degraded glass fiber (optical fiber) to manufacture an optical fiber grating (optical component), the mechanical strength decreases to degrade the reliability.

The present invention has been made to solve the above problem, and has as its object to provide an optical fiber grating with high reliability free from a decrease in mechanical strength or the like even if hydrogen is doped in an optical fiber at a high pressure, and a method of manufacturing the same. More specifically, the present invention relates to a method of manufacturing an optical fiber grating, in which a reflection grating is provided in a coated optical fiber (to be referred to be a coated fiber hereinafter) having a glass fiber as a bared optical fiber (to be referred to be a bared fiber hereinafter) having a $GeO_2$-doped core region and a cladding region, and a resin covering the outer surface of the bared fiber, and an optical fiber grating obtained by the method. In particular, according to the manufacturing method of the present invention, a hydrogen doping process is performed before an ultraviolet ray is irradiated. A target for the hydrogen doping process is a coated fiber obtained by covering the outer surface of a glass fiber (a bared fiber) with a resin.

More specifically, in the method of manufacturing an optical fiber grating according to the present invention, a bared fiber comprises a core region having a predetermined refractive index and doped with $GeO_2$ in a predetermined amount and a cladding region provided around the outer surface of the core region and having a lower refractive index than the core region, and a resin covering the outer surface of the bared fiber is prepared. This manufacturing method comprises the first step of exposing the prepared coated fiber for a predetermined period of time in a hydrogen atmosphere (i.e., a vessel to which hydrogen gas is supplied) in which hydrogen is pressurized at a predetermined pressure, thereby doping hydrogen in the coated fiber, the second step of removing part of the resin of the coated fiber doped with hydrogen to expose the surface of a predetermined region (i.e., a region in which a Bragg grating is to be formed) of the bared fiber, and the third step of irradiating, with an ultraviolet ray, the predetermined region of the bared fiber which is exposed upon removal of the resin in the second step, and changing a refractive index of the core region located at the exposed predetermined region along the longitudinal direction of the core region. In the optical fiber grating manufactured by the manufacturing method according to the present invention, an exposed area (area from the resin layer is removed after hydrogen doping process) is coated by a resin again in order to prevent degradation.

According to the manufacturing method of the present invention, a target in which a Bragg grating is to be formed is a coated fiber having a resin layer formed around the outer surface of the glass fiber. The resin layer is partially removed after hydrogen doping. The surface of the glass fiber does not degraded even if the coated fiber is exposed in the hydrogen atmosphere for a long period of time. In addition, the mechanical strength of the bared fiber itself can be maintained.

As in the present invention, when a hydrogen doping process is performed for a coated fiber in which the outer surface of a bared fiber to be formed with a Bragg grating is covered with a resin, bubbles may form or delaminations may occur at the interface between the glass fiber (bared fiber) and the resin. As a matter of course, when a Bragg grating is formed in such a coated fiber in which bubbles have formed or delaminations have occurred to manufacture an optical fiber grating (optical component), the mechanical strength or the like decreases to degrade the reliability.

In this specification, bubbles generated at the interface between the resin layer and the bared fiber (including a core region containing $GeO_2$ to form a Bragg grating) mean as a gap (having a size such that a tensile strength of the bared fiber itself is affected) having a thickness of 1 $\mu$m to 20 $\mu$m in a radius direction of the bared fiber and a maximum length of 1 $\mu$m to 10 mm, and as a minute gap. On the other hand, delamination means as a large gap of from a size of 10 mm to a size covering the whole optical fiber grating. In particular, when the delamination exists, since scattering light may become stronger at the gap, an outer surface of a portion of the obtained optical fiber grating in which the delamination is generated can be observed more brightly than an outer surface of a portion in which the delamination is not generated. Therefore, in the specification, the delamination means as a gap (having a larger size than the bubble) and is not included in the bubble of the specification.

The manufacturing method of the present invention also comprises, between the first and second steps, the fourth step of reducing a pressure of the hydrogen atmosphere at a predetermined rate. As described above, the pressure of the hydrogen atmosphere is reduced at the predetermined rate to gradually diffuse the hydrogen added to the bared fiber, thereby preventing generation of bubbles. More specifically, the present inventors found that the effective maximum pressure reducing rate was 120 atm/min or less and preferably 2 to 10 atm/min in reducing the pressure of the hydrogen atmosphere from the pressurized state to the normal pressure state. The pressurized state means as a state in which a pressure of at least 40 to 400 atm is applied. The normal pressure state is not limited to 1 atm, but includes a pressure equal to the outer pressure of the vessel to which hydrogen is supplied.

In the manufacturing method of the present invention, the hydrogen atmosphere in the pressurized state in the first step preferably has a pressure of 100 to 300 atm and an ambient temperature is within a range of 0° C. (preferably room temperature) to 100° C. When the hydrogen atmosphere is set under these conditions, hydrogen can be effectively added to the core region within a short period of time without thermally damaging the coating resin.

As the resin for covering the bared fiber, silicone resin can be used, but an ultraviolet curing resin is more preferable as compared with it, in view of pressure and temperature resistances.

In the optical fiber grating manufactured by the above manufacturing method, the outer surface of the bared fiber in which the grating is formed and the remained resin layer are in close contact with each other, and the sufficient tensile strength thereof can be obtained. In the obtained optical fiber grating, the number of bubbles generated is limited under 1000 per 1-m reference length even if both delaminations (gaps having a thickness of 1 $\mu$m or more in a radius direction and a maximum length of 10 mm or more) and bubbles (gaps having a thickness of 1 $\mu$m to 20 $\mu$m and a maximum length of 1 $\mu$m to 10 mm) are exist therein. Accordingly, the optical fiber grating, in which the rate of bubble generation as defined above is limited under 1000 bubbles/m, is included in the optical fiber grating according to the present invention even if the bubbles and delaminations are mixed therein.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENT

Figure 1:
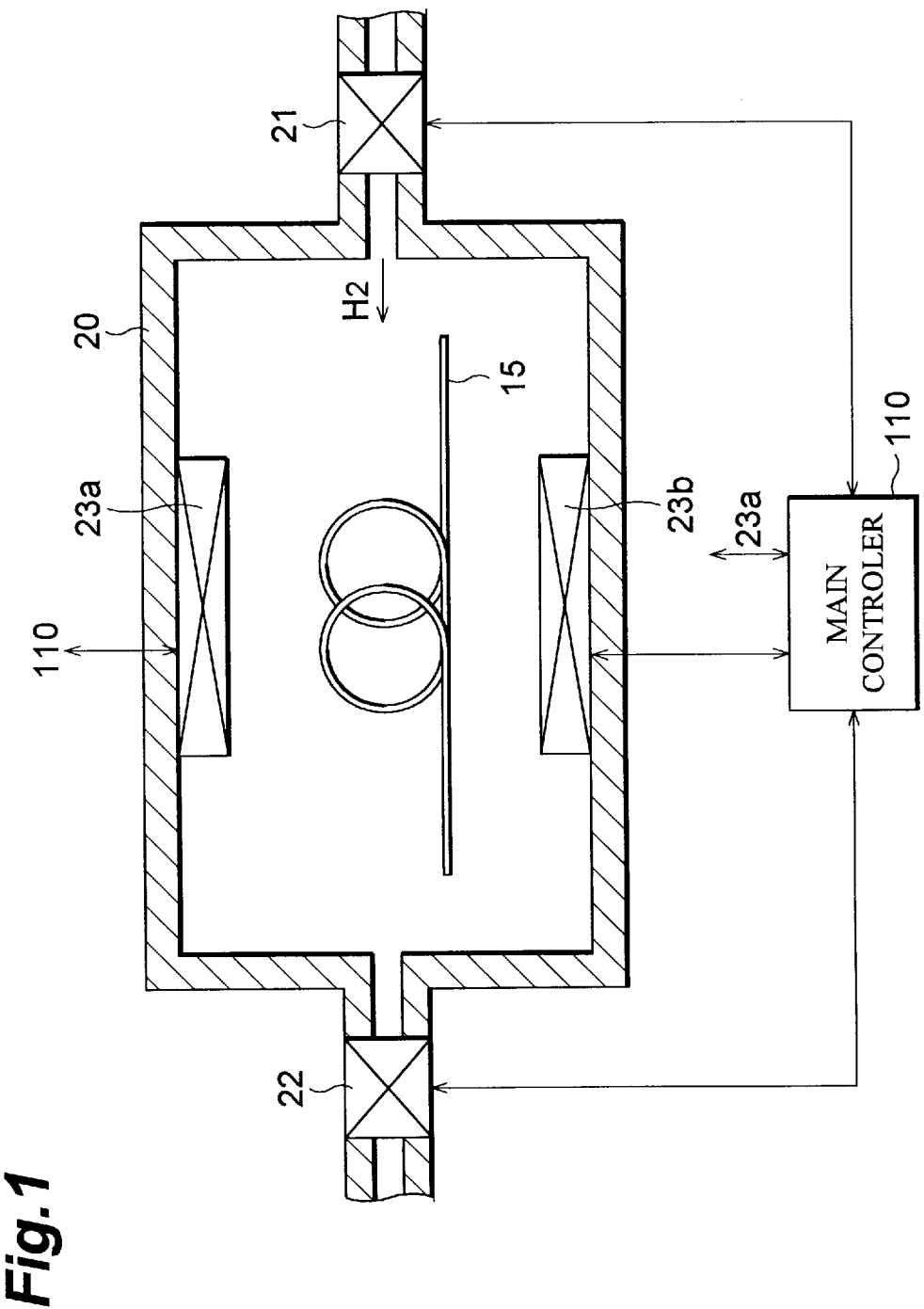
FIG. 1 is a view showing the schematic structure of a pressuring apparatus for practicing a method of manufacturing an optical fiber grating according to the present invention.

A method of manufacturing an optical fiber grating according to the present invention will be described with reference to FIGS. 1 to 8. The same reference numerals throughout the accompanying drawings denote the same parts, and a repetitive description thereof will be omitted.

According to the method of manufacturing an optical fiber grating of the present invention, a coated fiber is prepared, and the prepared coated fiber is set in a hydrogen atmosphere while adjusting the temperature. The hydrogen atmosphere is pressurized to a high pressure to add hydrogen to the core glass of the coated fiber.

More specifically, as shown in FIG. 1, hydrogen ($H_2$) gas is supplied through a valve 21 to a pressure vessel 20 in which a coated fiber 15 (see FIG. 2) obtained by coating a bared fiber 10 with a resin layer 14 is placed. In this case, the interior of the pressure vessel 20 is heated to a predetermined temperature by temperature regulators 23a and 23b such as heaters.

Figure 2:
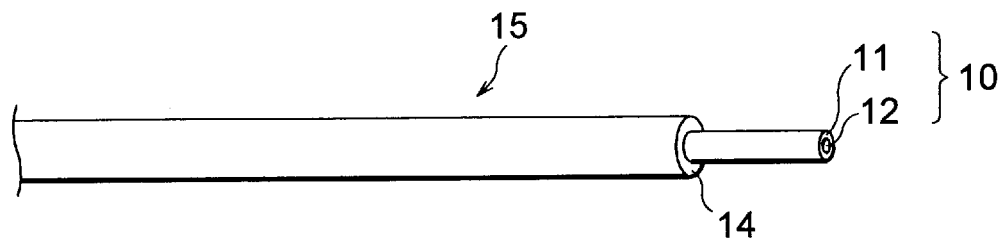
FIG. 2 is a view showing the structure of a coated fiber.

As shown in FIG. 2, the coated fiber 15 comprises a silica-based optical fiber (bared fiber) 10 having a core region 12 containing germanium oxide ($GeO_2$) and a resin layer 14 covering the outer surface of the bared fiber 10. The bared fiber 10 has a cladding region 11 having a lower refractive index than the core region 12. Silicone resin can be used to form the resin layer 14, but an ultraviolet curing resin having a high pressure resistance is preferable. The hydrogen doping process is performed for the coated fiber 15 having the resin layer 14. For this reason, this process is preferably performed in a hydrogen atmosphere at a temperature (ambient temperature in the vessel 20) ranging from 0° C. (preferably room temperature) to 100° C.

A concentration of hydrogen gas to be introduced is preferably higher as considering efficiency of the hydrogen doping process, and is necessary to be over 75% in view of preventing explosion.

The pressure of the hydrogen atmosphere in the vessel 20 is 20 to 400 atm. When the pressure of the hydrogen atmosphere is less than 20 atm, the effect of hydrogen doping cannot be substantially obtained. To enhance the effect of hydrogen doping, the hydrogen pressure is more preferably 100 atm or more. When the pressure of the hydrogen atmosphere exceeds 400 atm, the effect of hydrogen doping is saturated. The saturation of the effect tends to appear when the pressure of the atmosphere exceeds 300 atm. Therefore, the effective range of the pressure of the atmosphere is 100 to 300 atm.

When hydrogen is added to the coated fiber 15 by the above hydrogen doping process, the germanium oxide contained in the core region 12 of the bared fiber 10 tends to be reduced by the doped hydrogen, and thereby the part of oxygen bonded to Ge and Si is deprived. When Ge and Si deprived of bonded oxygen bond to each other, oxygen deficient defects are newly generated. Hence, the oxygen deficient defects that are normally present in a very small amount in the core region 12 of the bared fiber 10 increase.

The hydrogen doping process described above is performed to the coated fiber 15 in which the bared fiber 10 is covered with the resin. The surface of the bared fiber 10 is not brought into direct contact with air to prevent surface degradation of the bared fiber 10. Therefore, the strength of the bared fiber 10 can be maintained.

The pressure of the pressure vessel 20 maintained in a high pressure state upon supply of hydrogen gas thereto is reduced to normal pressure (1 atm or a pressure equal to the outer pressure of the vessel 20), and then the coated fiber 15 is removed from the vessel 20. In the coated fiber 15 doped with hydrogen, bubbles may form at the interface between the resin layer 14 and the surface of the bared fiber 10, or the resin layer 14 may delaminate from the surface of the bared fiber 10. It can be considered that expansion of hydrogen gas contained in the bared fiber 10 and the resin layer 14 in a large amount due to an abrupt decrease in pressure of the vessel 20 upon removal of the coated fiber 15 is responsible for such phenomena.

Figure 3:
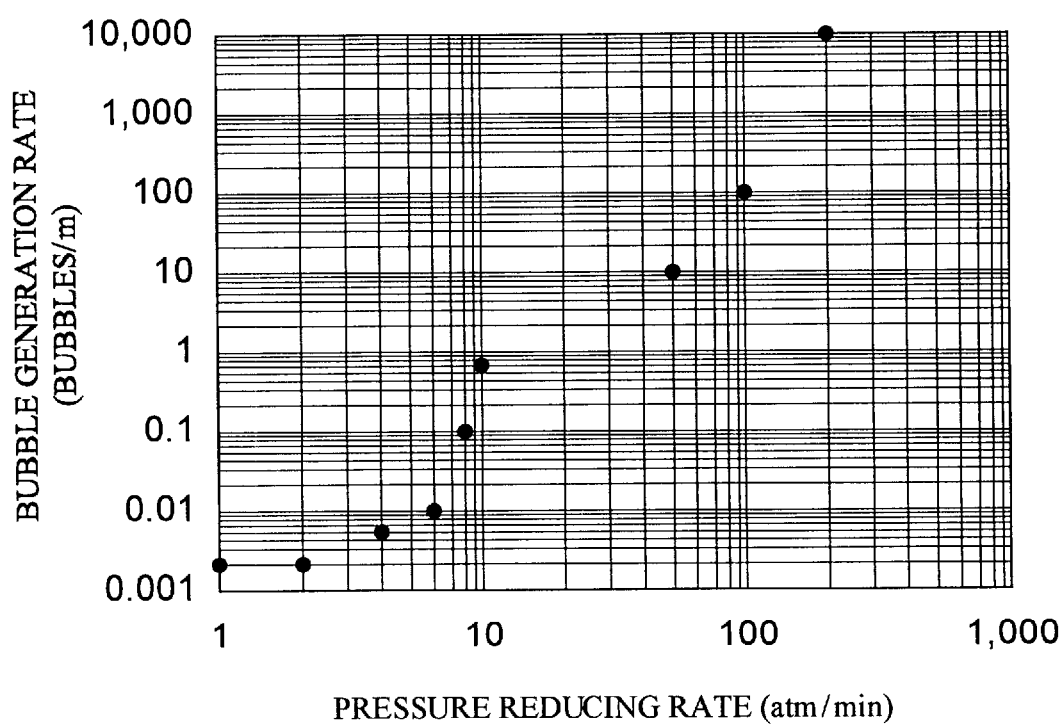
FIG. 3 is a graph showing the relationship between the pressure reducing rate (atm/min) and the bubble generation rate after the hydrogen doping process in the method of manufacturing an optical fiber grating according to the present invention.

In removing the hydrogen-doped coated fiber 15, the rate of reducing the pressure of the hydrogen atmosphere in the pressure vessel 20 to the outer pressure is examined. The relationship between the rate of reducing the pressure of the pressure vessel 20 to the outer pressure (almost 1 atm) and the number of bubbles generated at the interface between the resin layer 14 and the surface of the bared fiber 10 is examined under the conditions that the temperature in the pressure vessel 20 is 25° C. (room temperature) and the pressure of the hydrogen atmosphere in the pressure vessel 20 is 300 atm. As shown in the graph of FIG. 3, the present inventors found that the rate of bubble generation was one bubble/m at a pressure reducing rate of 10 atm/min or less, and nearly zero at a pressure reducing rate of 2 atm/min or less. On the basis of the graph of FIG. 3, it can be also understood that the maximum pressure reducing rate is necessary to be under 120 atm/min in order to suppress the rate of bubble generation under 1000 bubbles/m.

Figure 4:
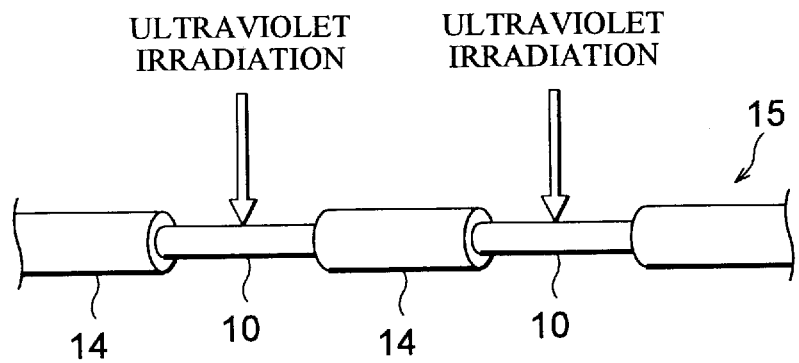
FIG. 4 is a view showing a coated fiber (part of the coating layer is removed) used in the method of manufacturing an optical fiber grating according to the present invention.

Prior to forming a Bragg grating on the elongated coated fiber 15 having undergone the hydrogen doping process, the resin layer 14 is removed from a portion at which the grating is to be formed, as shown in FIG. 4. The removal of the resin layer 14 allows efficient irradiation of an ultraviolet ray for forming the grating. The remaining portion of the resin layer 14 can maintain the mechanical strength (particularly the tensile strength) of the bared fiber 10. The resin layer 14 is left in sufficient tight contact with the surface of the optical bared 10 (the rate of bubble generation of under 1000 bubbles/m).

Figure 5:
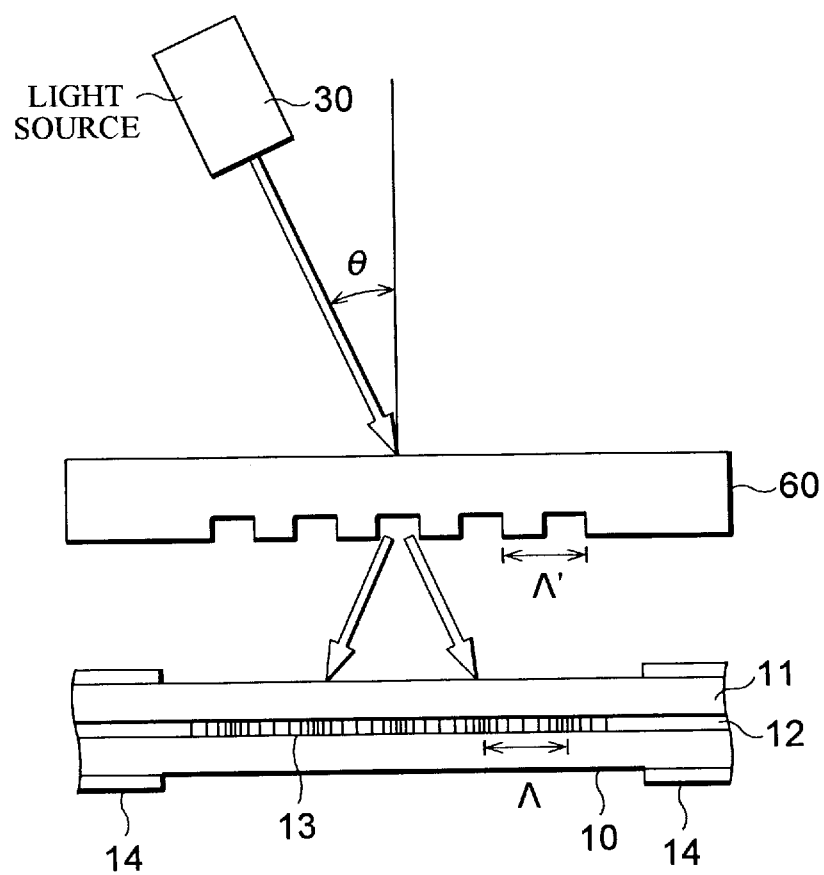
FIG. 5 is a view for explaining the step (phase grating method) of writing a Bragg grating in the method of manufacturing an optical fiber grating according to the present invention.

Interference light of ultraviolet is irradiated on the region of the hydrogen-doped coated fiber 15 from which the resin layer 14 is removed. FIG. 5 is a view for explaining irradiation of interference light of ultraviolet according to a phase grating method. An ultraviolet ray having a predetermined wavelength is irradiated on a predetermined region (i.e., the region of the coated fiber 15 from which the resin layer 14 is removed) of the coated fiber 10, so that the refractive index of the exposed region in the core region 12 doped with oxygen germanium changes. At present, the mechanism of a refractive index change induced by ultraviolet irradiation is not perfectly accounted for yet. However, it is generally speculated that oxygen deficient defects associated with Ge normally present in a very small amount in the core region 12 of the bared fiber 10 are associated with the photoinduced refractive index change.

As the oxygen deficient defects normally present in a very small amount in the core region 12 of the bared fiber 10 doped with hydrogen in the hydrogen doping process increase, the photoinduced refractive index change in the region exposed with the ultraviolet ray increases.

The ultraviolet ray for inducing the refractive index change is irradiated from a light source 30 at an angle θ with respect to the normal to a phase grating 60 in which phase patterns are arrayed at a predetermined spacing Λ'. For this reason, an interference fringe spacing Λ is defined as follows:

$$\Lambda = \Lambda'$$

Therefore, regions having different refractive indices are arranged at the interference fringe spacing Λ as the period along the axial direction (longitudinal direction of the core region 12) of the bared fiber 10, thereby photowriting a Bragg grating 13.

On the basis of the known Bragg diffraction condition, a reflection wavelength (Bagg wavelength $\lambda_R$) of the grating 13 is given by:

$$\lambda_R = 2n\Lambda$$
$$= 2n\Lambda'$$

where n is the refractive index of the core region 12 and Λ is the period of the grating 13. A reflectance R of the grating is given by:

$$R = \tanh^2(L\pi\Delta n/\lambda_R)$$

where L is the length of the grating 13 and Δn the amount of photoinduced refractive index change in the core region 12. Since the grating 13 is formed to have a photoinduced refractive index change as large as about $10^{-4}$ to $10^{-3}$ in the core region 12 of the bared fiber 10, the reflectance R with respect to the light component having the wavelength $\lambda_R$ reaches almost 100%. The ultraviolet interference fringes may be formed by holography as well.

In the optical fiber grating thus manufactured, the region from which the resin layer 14 is removed and in which the grating is formed is re-coated by a resin 140.

Figure 6:
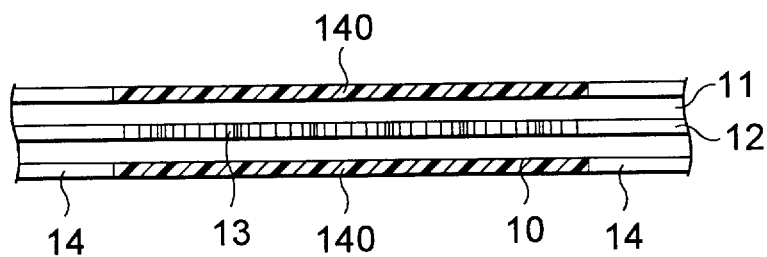
FIG. 6 is a sectional view showing the structure of an optical fiber grating according to the present invention which is produced by the manufacturing method according to the present invention.
Figure 7:
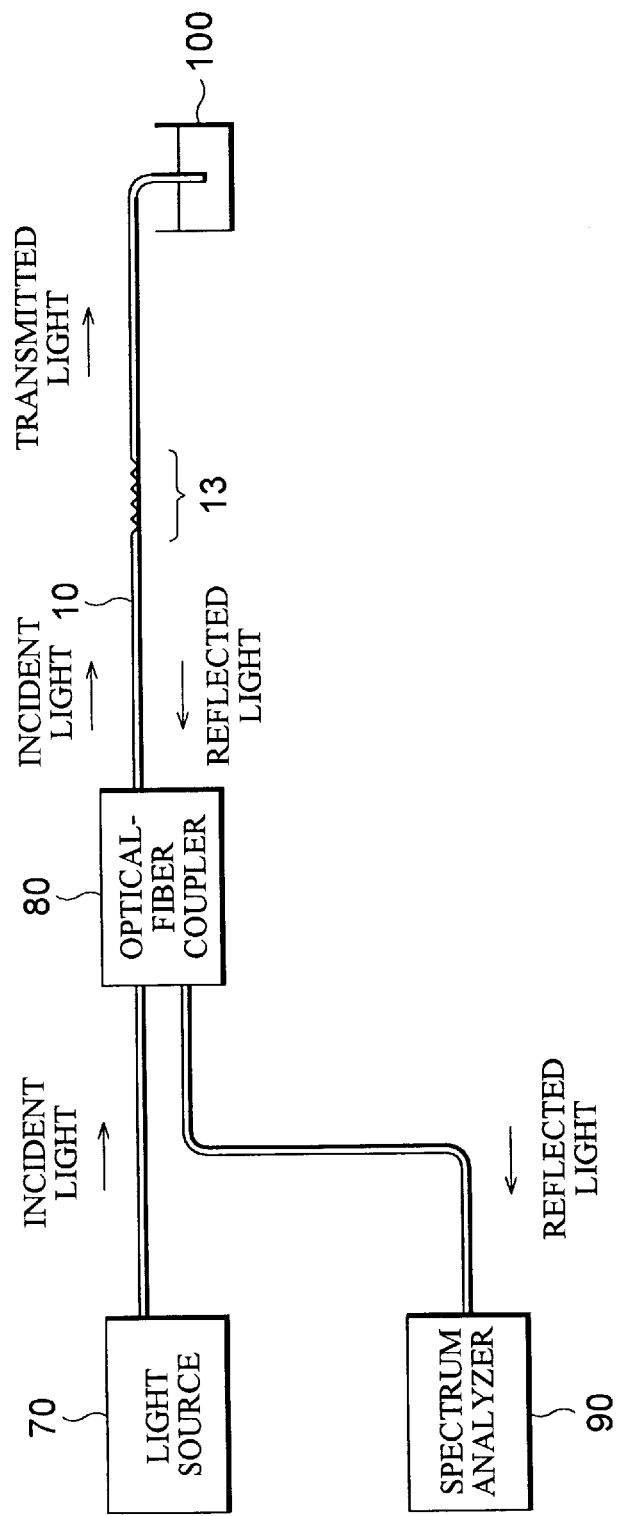
FIG. 7 is a view showing the structure of a measuring system for measuring the reflectance of the optical fiber grating.

The reflectance R of the optical fiber grating as shown in FIG. 6 is measured as follows. FIG. 7 is a view showing the arrangement of a measurement system for measuring the reflectance of the resultant optical fiber grating.

As shown in FIG. 7, this measurement system is arranged to optically couple a light source 70, the coated fiber 15, and a spectral analyzer 90 through a photocoupler 80.

The light source 70 is normally a light-emitting diode or the like for emitting light containing a light component having a wavelength coinciding with the reflection wavelength $\lambda_R$ of the Bragg grating 13 formed in the coated fiber 15. The photocoupler 80 is a normal melt-spun fiber coupler for outputting incident light from the light source 70 to the coated fiber 15 and outputting reflected light from the coated fiber 15 to the spectral analyzer 90. The spectral analyzer 90 detects the relationship between the wavelength and light intensity of the reflected light from the coated fiber 15. Note that the open end of the coated fiber 15 is dipped in a matching oil 100. This matching oil 100 is a normal refractive index matching solution and eliminates undesirable reflected light components.

According to the measurement system shown in FIG. 7, light emitted from the light source 70 is incident on the coated fiber 15 through the photocoupler 80. The grating 13 formed in the core region 12 of the coated fiber 15 reflects a light component having a specific wavelength. The light emerging from the coated fiber 15 is received by the spectral analyzer 90 through the photocoupler 80. The spectral analyzer 90 detects the reflection spectrum of the coated fiber 15 which represents the relationship between the wavelength and light intensity of the reflected light.

Figure 8:
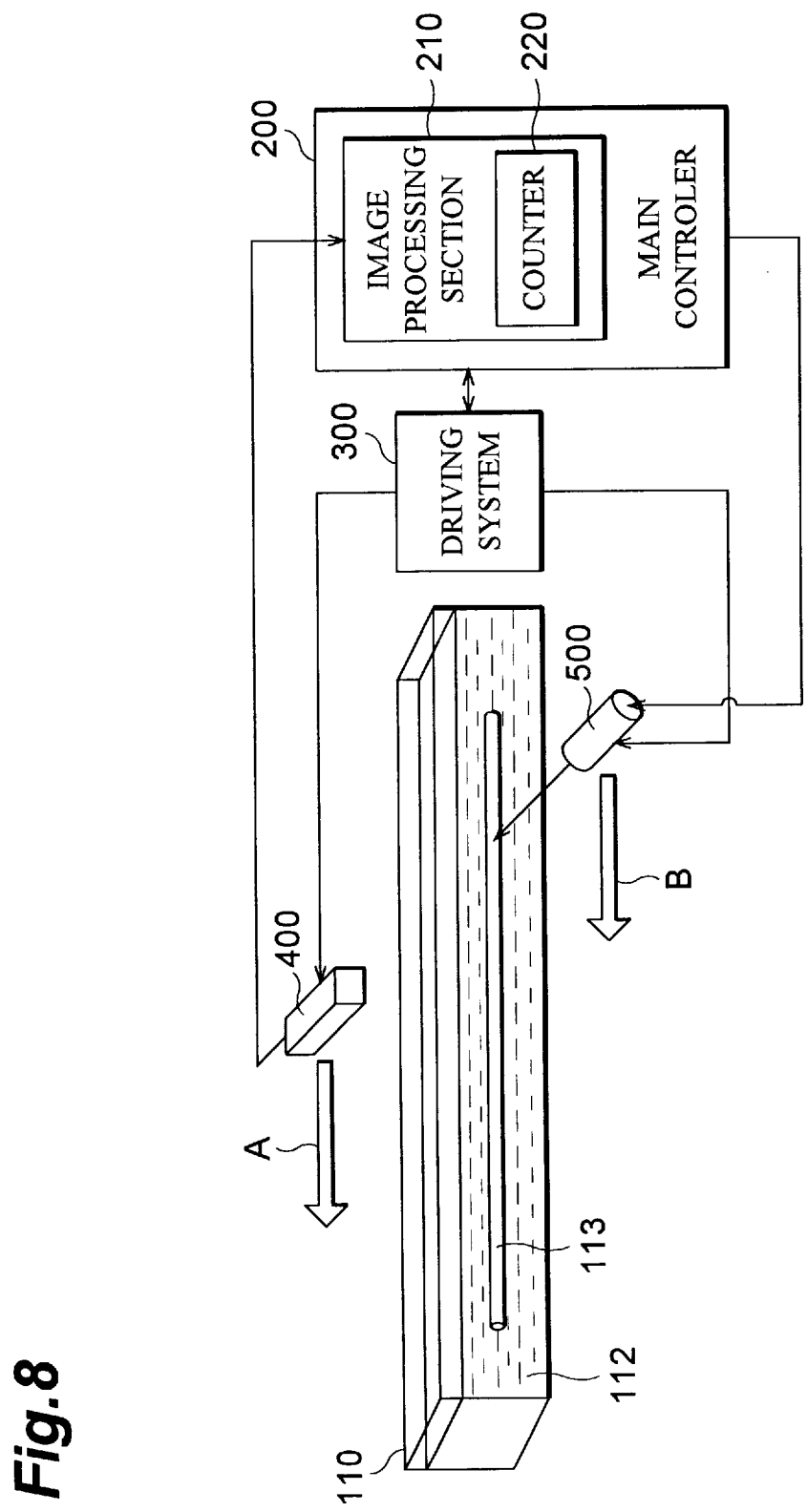
FIG. 8 is a view showing the structure of a measuring system for measuring the number of bubbles generated in the obtained optical fiber grating.

In the hydrogen doped coated fiber, a degree of contact between a bared fiber and a resin layer is measured by using a measurement system, as shown in FIG. 8, counting the number of bubbles (not including delaminations) at an interface between the surface of the bared fiber and the resin layer.

The measurement system of FIG. 8 comprises a light source (He-Ne laser) 500 and a CCD sensor 400 arranged while sandwiching an observation container 110 together. The coated fiber 113 (containing hydrogen) as a measurement target has 1-m length, and it is set within the container 110 filled with a matching oil 112. The measurement system further comprises a driving system 300 for respectively moving the light source 500 and the CCD sensor 400 along a longitudinal direction (shown by arrows A and B in figure) of the observation container 110, and a main controller 200 for controlling the light source 500 and the driving system 300 and for receiving image data (electric signals) from the CCD sensor 400, thereby counting the number of bubbles generated in the measurement target 113. The main controller 200 has an image processing unit 210 for obtaining brightness information on the basis of electric signals inputted from the CCD sensor 400, and the image processing unit 210 includes a counter 220 for counting the number of positions (bubbles) where the brightness changes within a shoot region of the CCD sensor 400.

In particular, when a bubble (a gap having a size such that a tensile strength is sufficiently affected) exists between the resin layer and the surface of the bared fiber in the set coated fiber 113, scattering light would become strong at the position where the gap exists. Accordingly, the CCD sensor 400 receives laser beam (image of the target 113) from the light source 500 which passes through the measurement target 113, and thereby the image processing unit 210 in the main controller 200 can precisely recognize differences of brightness on the basis of the obtained CCD images.

The axis of ordinate in the graph of FIG. 3 appears mean values of the number of bubbles (target to be counted) generated in twenty prepared optical fiber gratings which are measured by the measurement system of FIG. 8, under each pressure reducing condition. Further, delaminations (gaps having a thickness of 1 μm or more and a maximum length of 10 mm or more) are excepted from targets to be counted in the measurement system of FIG. 8.

EMBODIMENT 1

A coated fiber having a diameter of 250 μm and a length of 100 m and obtained by coating a silica-based optical fiber (bared fiber) having a diameter of 125 μm with an ultraviolet curing resin was prepared. This coated fiber was placed in a pressure vessel 20 held at a temperature of 25° C. and was left to stand in hydrogen gas for a week, while the pressure of hydrogen gas (having concentration of 99% or more) supplied to the vessel 20 was maintained at 240 atm. The pressure of the hydrogen gas was reduced to the outer pressure at a pressure reducing rate of 4 atm/min, and the pressure vessel 20 was opened. The hydrogen-doped coated fiber was removed. After the resin layer of the removed coated fiber was removed, a tensile strength test was conducted for the glass fiber (coated fiber) and the tensile strength obtained was 4.0 GPa.

In addition, the present inventors formed a Bragg grating in the core region of this bared fiber (the region from which the resin of the coated fiber was removed), and the strength of the resultant bared fiber was examined. No practical problem was posed.

COMPARATIVE EXAMPLE 1

A hydrogen doping process for a glass fiber not covered with a resin was performed following the same procedures as in Example 1. After the glass fiber was removed from a pressure vessel 20, a tensile strength test was conducted, and the tensile strength obtained was 0.5 GPa. It is assumed that since the glass fiber was exposed in air for a long period of time, the surface deteriorated, and the strength was reduced.

EMBODIMENT 2

The coated fiber doped with hydrogen in Embodiment 1 above was observed by the measurement system shown in FIG. 8, but no bubble was found anywhere. It is assumed that the hydrogen gas contained in the glass fiber (bared fiber) and the coating resin (resin layer) diffused into a pressure vessel 20 due to a gradual decrease in pressure of the hydrogen gas in the pressure vessel 20. The present inventors made a Bragg grating in the core region of this bared fiber and examined the strength of the bared fiber. No problem was posed. When a tensile strength test for the coated fiber was conducted, the tensile strength measured was about 4.8 GPa.

EMBODIMENT 3

A hydrogen doping process for a glass fiber (bared fiber) was performed following the same procedures as using a coated fiber identical to that in Embodiment 1. In Embodiment 3, the pressure reducing rate was set to 100 atm/min. The coated fiber was removed from a pressure vessel 20 and observed by the measurement system shown in FIG. 8. 50 to 300 bubbles per 1-m length were found. The tensile strength of this coated fiber was found to be about 2.4 GPa.

COMPARATIVE EXAMPLE 2

A hydrogen doping process for a glass fiber (bared fiber) was performed following the same procedures as using a coated fiber identical to that in Embodiment 1. In Comparative Example 2, the pressure reducing rate was set to 200 atm/min. The coated fiber was removed from a pressure vessel 20 and observed by the measurement system shown in FIG. 8. 1500 to 2000 bubbles per 1-m length were found. The tensile strength of this coated fiber was found to be about 2.0 GPa. However, when degradation test was performed by soaking each of samples of this Comparative Example 2 into hot water of 85° C. for 240 days, it is found that the tensile strength thereof reduces to 0.6 GPa. A fiber type optical component as the present optical fiber grating is required a tensile strength of 0.8 GPa or more. As considering an elapsed strength degradation, the tensile strength has to be secured for a long time.

As easily understanding on the basis of the above explanations, in the optical fiber grating obtained by the method according to the present invention, the number of bubbles (containing a condition that bubbles and delaminations are mixed) is necessary to be under 1000 per 1-min length (pressure reducing rate of 120 atm/m or less), as considering manufacturing errors, a practical tensile strength, or the like of the resultant optical fiber grating.

As has been described above, according to the present invention, a hydrogen doping process is 25 performed for a coated fiber covered with a resin. For this reason, the strength (particular the tensile strength) of the bared fiber can be maintained because the glass fiber will not be brought into direct contact with air.

According to the present invention, after a hydrogen doping process for the coated fiber is performed for a predetermined period of time while keeping the coated fiber in a high pressure state, the pressure of the hydrogen gas is gradually reduced to the outer pressure (e.g., normal pressure). For this reason, hydrogen doped in the glass fiber and the coating resin (resin layer) does not abruptly expand, but gradually diffuses outside. Therefore, no bubbles form on the surface of the glass fiber, or the glass fiber does not delaminate from the resin layer.

In addition, an optical fiber grating manufactured by the above manufacturing method can be obtain an desirable strength even if both bubbles and/or delaminations are mixed therein.

From the invention thus described, it will be obvious that the invention may be varied in many ways.

Such variations are not to be regarded as a departure from the spirit and scope of the invention, and all such modifications as would be obvious to one skilled in the art are intended for inclusion within the scope of the following claims.

The basic Japanese Applications No.8-147598 (147598/1996) filed on Jun. 10, 1996 is hereby incorporated by reference.

What is claimed is:

1. A method of manufacturing an optical fiber grating, comprising:

the first step of preparing a coated fiber comprising: a bared fiber having a core region having a predetermined refractive index and a cladding region provided around an outer surface of said core region and having a lower refractive index than said core region; and a resin covering an outer surface of said bared fiber, and exposing said prepared coated fiber in an atmosphere containing hydrogen at a predetermined pressurized state for a predetermined period of time, thereby doping hydrogen in said coated fiber;

the second step of partially removing said resin of said coated fiber doped with hydrogen in the first step, thereby exposing a surface of a predetermined portion of said bared fiber; and the third step of irradiating an ultraviolet ray onto the exposed predetermined portion of said bared fiber from which said resin is removed in the second step, thereby changing a refractive index of said core region in the exposed predetermined portion of said bared fiber along a longitudinal direction of said core region.

2. A method according to claim 1, further comprising, between the first step and the second step, the fourth step of reducing the pressure of the atmosphere containing hydrogen at a predetermined rate.

3. A method according to claim 1, wherein, in the first step, the pressure of the atmosphere containing hydrogen in the pressurized state is 100 to 300 atm, and an ambient temperature is not more than 100° C.

4. A method according to claim 2, wherein, in the fourth step, a maximum pressure reducing rate for reducing the pressure of the atmosphere containing hydrogen from the pressurized state is not more than 10 atm/min.

5. A method according to claim 4, wherein, in the fourth step, a maximum pressure reducing rate for reducing the pressure of the hydrogen atmosphere from the pressurized state falls within a range of 2 to 10 atm/min.

6. A method according to claim 1, wherein said resin covering said outer surface of said bared fiber is an ultraviolet curing resin.

7. An optical fiber grating manufactured by the method according to claim 1, wherein said resin remaining in the second step and said outer surface of said bared fiber are in close contact with each other such that the number of bubbles at an interface between said remained resin and said outer surface of said bared fiber is not greater than 1000 per 1-m length, each of said bubbles having a thickness of 1 $\mu$m to 20 $\mu$m in a radius direction of said bared fiber and a maximum length of 1 $\mu$m to 10 mm.

8. An optical fiber grating comprising:

a core region containing a predetermined amount of germanium oxide and having a predetermined refractive index;

a cladding region provided around an outer surface of said core region and having a lower refractive index than said core region;

a grating provided in a predetermined portion of said core region along a longitudinal direction of said core region; and a resin covering an outer surface of said cladding region without covering said predetermined portion of said core region in which said grating is formed, wherein said resin is in close contact with said outer surface of said cladding region such that the number of bubbles at an interface between said resin and said outer surface of said cladding region is not greater than 1000 per 1-m length, each of said bubbles having a thickness of 1 $\mu$m to 20 $\mu$m in a radius direction from said cladding region toward said resin and a maximum length of 1 $\mu$m to 10 mm.

* * * * *